(12) United States Patent
Lindteigen

(10) Patent No.: US 8,898,476 B1
(45) Date of Patent: Nov. 25, 2014

(54) CRYPTOGRAPHIC PASSCODE RESET

(71) Applicant: Cummings Engineering Consultants Inc., Chandler, AZ (US)

(72) Inventor: Ty Brendan Lindteigen, Chandler, AZ (US)

(73) Assignee: SAIFE, Inc., Chandler, AZ (US)

( * ) Notice: Subject to any disclaimer, the term of this patent is extended or adjusted under 35 U.S.C. 154(b) by 0 days.

(21) Appl. No.: 13/671,534

(22) Filed: Nov. 7, 2012

Related U.S. Application Data

(60) Provisional application No. 61/628,996, filed on Nov. 10, 2011.

(51) Int. Cl.
*G06F 21/00* (2013.01)
*G06F 21/60* (2013.01)
*G06F 21/45* (2013.01)
*G06F 21/34* (2013.01)
*H04L 9/08* (2006.01)

(52) U.S. Cl.
CPC .............. *G06F 21/45* (2013.01); *G06F 21/604* (2013.01); *G06F 2221/2131* (2013.01); *G06F 21/34* (2013.01); *H04L 9/0861* (2013.01)
USPC ............................................ 713/184; 380/286

(58) Field of Classification Search
CPC ......................... G06F 2221/2131; G06F 21/45
See application file for complete search history.

(56) References Cited

U.S. PATENT DOCUMENTS

| | | | | |
|---|---|---|---|---|
| 5,208,853 A | * | 5/1993 | Armbruster et al. | 705/56 |
| 5,930,754 A | * | 7/1999 | Karaali et al. | 704/259 |
| 7,325,141 B2 | * | 1/2008 | Chow et al. | 713/183 |
| 8,332,650 B2 | * | 12/2012 | Banes et al. | 713/182 |
| 8,429,760 B2 | * | 4/2013 | Tribble | 726/36 |
| 2010/0303229 A1 | * | 12/2010 | Unruh | 380/28 |

* cited by examiner

*Primary Examiner* — Gilberto Barron, Jr.
*Assistant Examiner* — Wayne An

(57) ABSTRACT

This invention provides a novel method, system, and apparatus allowing an authorized user access to controlled assets when a passcode method malfunctions, such as when a user forgets a password, a token malfunction, or a biometric mismatch. The invention allows temporary access to an access control system without knowing the password and without sending the user the password or a new random password. The user is able to set a new password without knowing the previous password. Furthermore, stored encrypted data is preserved and made accessible once again via the new passcode. This invention works for many authentication methods such as restoring access when a password, token, access card, or biometric sample is used.

16 Claims, 6 Drawing Sheets

CRYPTOGRAPHIC PASSCODE RESET

CROSS-REFERENCE TO RELATED APPLICATIONS

The present application is related to and claims priority from prior provisional application Ser. No. 61/628,996 filed Nov. 10, 2011.

FIELD OF THE INVENTION

This invention relates generally to the field of protecting secured assets, and particularly a method and system for creating a passcode to allow a user access to controlled assets and a passcode recovery process for when the source of the passcode fails to function.

BACKGROUND OF THE INVENTION

The protection of valuable assets is vital for government, private entities and individuals. Valuable assets are commonly protected by various access control systems to ensure that access to the assets are limited to only authorized persons. This includes protecting physical assets such as research labs with expensive equipment and file cabinets containing sensitive private information stored in the human resource department of a corporate office. Applications also include protecting electronic assets in the form of electronic data stored in computer and electronic systems. Access control systems use various authentication methods to control access to the physical and electronic assets. Typical authentication methods include passwords, tokens, access cards, biometrics, or other passcodes that ensure only authorized persons have access to the valuable assets.

Several problems arise when the authentication process malfunctions, such as when a user forgets a password, a token fails to work, or biometric match failure. Furthermore with respect to electronic data, stored and encrypted data will be lost, when a security system uses the passcode as an input for a data encryption algorithm or other secure transformation function. Users are encumbered with security features that require users to remember passwords, carry tokens, or utilize biometric features, so it is inevitable that such authentication methods regularly malfunction.

Existing authentication methods are vulnerable to misuse when a user attempts to recover a passcode after the authentication method fails to function, such as when the user forgets a password, has a malfunctioning token, or experiences a biometric match failure. For example, to reset a password the access control system must keep a record of the password in a database and send a copy to the user upon request. Alternatively, the access control system may establish a new random password and send a copy to the user. In both cases, the access control system knows the user's password. The password is thus vulnerable to disclosure to unauthorized users by means of attacks on the server, database, or the copy sent to the user. The password is also vulnerable to disclosure by unauthorized users from insider threats that lookup or reset the password from within the access control system. Furthermore, stored encrypted data will be permanently lost if the security system used the password as an input to the encryption algorithm and the original password was not stored in backup, or the user's stored encrypted data is susceptible to decryption by an unauthorized user with access to the stored password in backup.

This invention provides a novel method allowing an authorized user access to controlled assets when a passcode method malfunctions, such as when a user forgets a password, a token malfunction, or a biometric mismatch. For example, the invention allows temporary access to an access control system without knowing the password and without sending the user the password or a new random password. The user is able to set a new password without knowing the previous password. Furthermore, stored encrypted data is preserved and made accessible once again via the new password. This invention works for many authentication methods such as restoring access when a password, token, access card, or biometric method is used.

BRIEF SUMMARY OF THE INVENTION

In one embodiment of the invention a method for creating a passcode which may be derived from a password, token or biometric sample to allow a user access to controlled assets and a passcode code recovery process for when the source of the passcode (i.e. password, token, or biometric sample) fails to function comprises the first step of creating a passcode. Next, if needed, the passcode is converted into a numeric value. Next, either a predetermined value or a generated random code that is at least the same order of magnitude as the passcode or its numeric conversion is used as the first cryptographic recovery split. Next, the passcode and random code are used as inputs in a cryptographic derivation function to form a second cryptographic recovery split. More recovery splits may be generated if needed, but two is the minimum required. Next, the first cryptographic recovery split is stored in one repository and the second cryptographic recovery split is stored in a second repository that is isolated from the first repository. Next, when the source of the passcode fails to function, the first cryptographic recovery split is retrieved from the first repository and the second cryptographic recovery split is retrieved from the second repository. Next, the two cryptographic recovery split values are recombined in a reverse operation to reproduce the original passcode. Next, a new source of the passcode is supplied (i.e. a new password, new token, or new biometric sample) and cryptographically reconciled with the cryptographic derivation function to produce the same passcode. Alternatively, a new passcode can be generated and all existing electronic data may be encrypted using the new passcode instead of the original passcode. Next, a new random code is created that is at least the same size as the new passcode. Finally, the new passcode and new random code are used as inputs in a cryptographic derivation function to form a new second cryptographic recovery split with the new first cryptographic recovery split stored in a first repository and the new second cryptographic recovery split stored in a second repository.

In another embodiment of the invention a system for creating a passcode which may be derived from a password, token or biometric sample to allow a user access to controlled assets and a passcode code recovery process for when the source of the passcode (i.e. password, token, or biometric sample) fails to function comprises a first device for creating a passcode. The passcode creation device is coupled to a random code generation device that uses a predetermined value or creates a random code of at least the same order of magnitude as the passcode to be used as a first cryptographic recovery split. Next a cryptographic derivation function device executes a cryptographic split operation using the passcode and random code as inputs to form a second cryptographic recovery split. The cryptographic derivation function device is coupled to at least two repositories. The random code is stored in the first repository as one cryptographic recovery split. The output of the cryptographic derivation function is stored in a second repository as the second cryptographic split. The source of the passcode (i.e. password, token, or biometric sample) is not stored in the first or second repositories; instead it is either stored in the user's memory, on an access card or another type of storage device separate from the first or second repositories. Next, when the source of the passcode (i.e. password, token, or biometric sample) fails to function the user initiates the passcode code recovery device which retrieves the random code from the first repository and the output of the cryptographic derivation function from the second repository then the two cryptographic recovery split values are recombined in a reverse operation to reproduce the original passcode. Next, a new source of the passcode is supplied (i.e. a new password, new token, or new biometric sample) and cryptographically reconciled with the cryptographic derivation function to produce the same passcode. Alternatively, a new passcode can be generated and all existing electronic data may be encrypted using the new passcode instead of the original passcode. Finally, the devices of this system are used again to repeat the steps required creating a new random code and new cryptographic recovery splits.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION OF THE INVENTION

The following describes the details of the invention. Although the following description will proceed with reference being made to illustrative embodiments, many alternatives, modifications, and variations thereof will be apparent to those skilled in the art. Accordingly, it is intended that the claimed subject matter be viewed broadly. Examples are provided as reference and should not be construed as limiting. The term "such as" when used should be interpreted as "such as, but not limited to."

Figure 1:
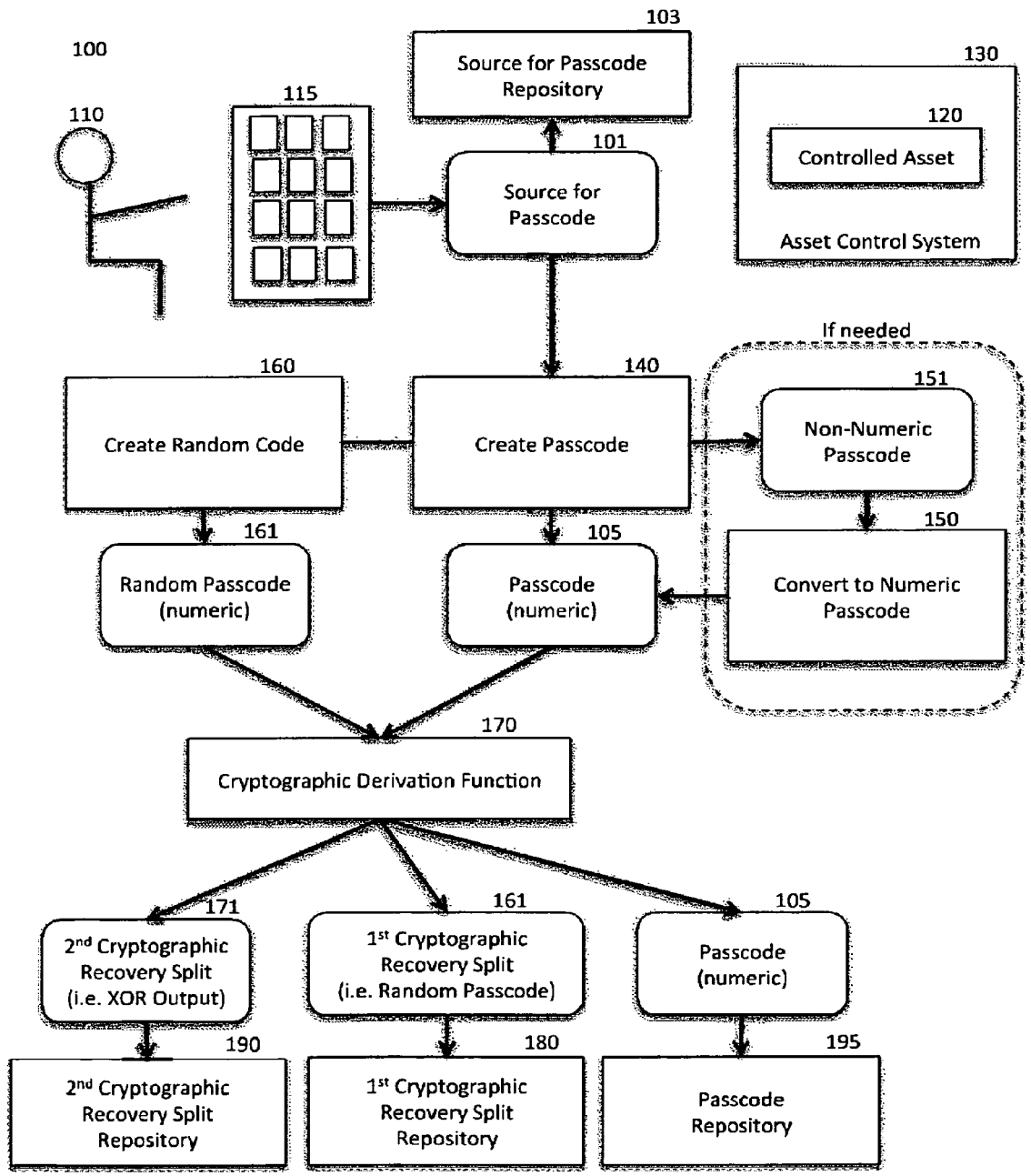
FIG. 1 is a diagram of an exemplary embodiment for creating a passcode and the cryptographic recovery splits needed for the passcode recovery process in accordance with the teachings of the present invention.

FIG. 1 is a diagram of an exemplary embodiment for a method 100 to create a passcode 105 allowing a user 110 access to controlled assets 120 within an access control system 130. The user 110 described throughout this specification may include a person, or an automated system controlled by computer software or other artificial intelligence. The controlled assets 120 may be physical assets such as a building, locked room, safe, or file cabinet; or an electronic asset such as data stored on a computer or electronic system. Furthermore, the passcode 105 and access control system 130 may comprise any type of system intended to control access to controlled assets 120 such as a direct passcode system, a token system which essentially stores the source of the passcode on a token device such as an RF chip within a fob or an access card, or a biometric system which essentially associates a passcode to the unique biometric features of a person, or thing, or any type of access control system that essentially uses a passcode. Examples of this invention are provided as reference throughout the specification using various passcode and access control systems, but any passcode and access control system may be substituted in the examples to exemplify this invention.

First the source for the passcode 101 is used as an input to create the passcode 140. For example, a user 110 uses a numerical input console 115 to create a source for the passcode 101 that is used as the input to create a passcode 105 which allows the user 110 to access the controlled assets 120 within the access control system 130. In some circumstances, the access control system 130 may allow use of a non-numeric passcode 151 such as a code using letters or special characters. In such a circumstance, the non-numeric passcode 151 is converted 150 to the passcode 105 with a numerical value. Next either a predetermined value or numerical random code 161 is created that is the same order of magnitude or greater as the value of the passcode's 105 numeric value. For example, if the passcode 105 comprises a number with six digits, the random code 161 will also comprise at least six digits.

Next the random code 161 and the passcode 105 are used as inputs for a cryptographic derivation function 170 to form a second cryptographic recovery split 171. More recovery splits may be generated if needed, but two is the minimum required. The cryptographic derivation function 170 may be accomplished by using a reversible algorithm such as the Exclusive-OR ("XOR") binary Boolean algebraic operation. The passcode 105 and random code 161 are used as inputs in the cryptographic derivation function 170 to form a second cryptographic recovery split 171 with the first encrypted split 161 stored in one repository 180 and the second encrypted split 171 stored in a second repository 190. For example, the random code 161 is stored on a first storage device as one cryptographic split and the output of the cryptographic split 171 is stored on a second storage device as the second cryptographic split component 171. The order in which the encrypted splits 161 and 171 are stored is not significant. The output from the XOR operation 171 could be stored in the first repository and the random code 161 could be stored in the second repository.

The passcode 105 is not stored on the first or second repositories; instead it is stored in a repository separate from the first or second repositories 180 and 190 that contain the recovery splits 161 and 171. Alternatively, one of the cryptographic recovery splits 161 or 171 may be stored on the asset control system 130 or the same device that contains the user's encrypted data. The source of the passcode such as the password, token, or biometric sample is not stored in the first or second repositories; instead it is either stored in the user's memory, on an access card or another type of storage device separate from the first or second repositories 195.

The XOR operation is ideal for encryption since it is virtually impossible to reverse without knowing the initial value of one of the two binary arguments and the output from the XOR operation; however any other type of reversible cryptographic split operation may be used. In other words, using the XOR operation the passcode 105 cannot be recovered without the random code 161 and the output of the XOR operation 171. The random code 161 and the output of the XOR operation 171 are each useless by themselves because they individually cannot be used to recover the passcode 105. However, the passcode 105 can be recovered when the random code 161 and the output of the XOR operation 171 are subjected to the inverse XOR operation.

Figure 2:
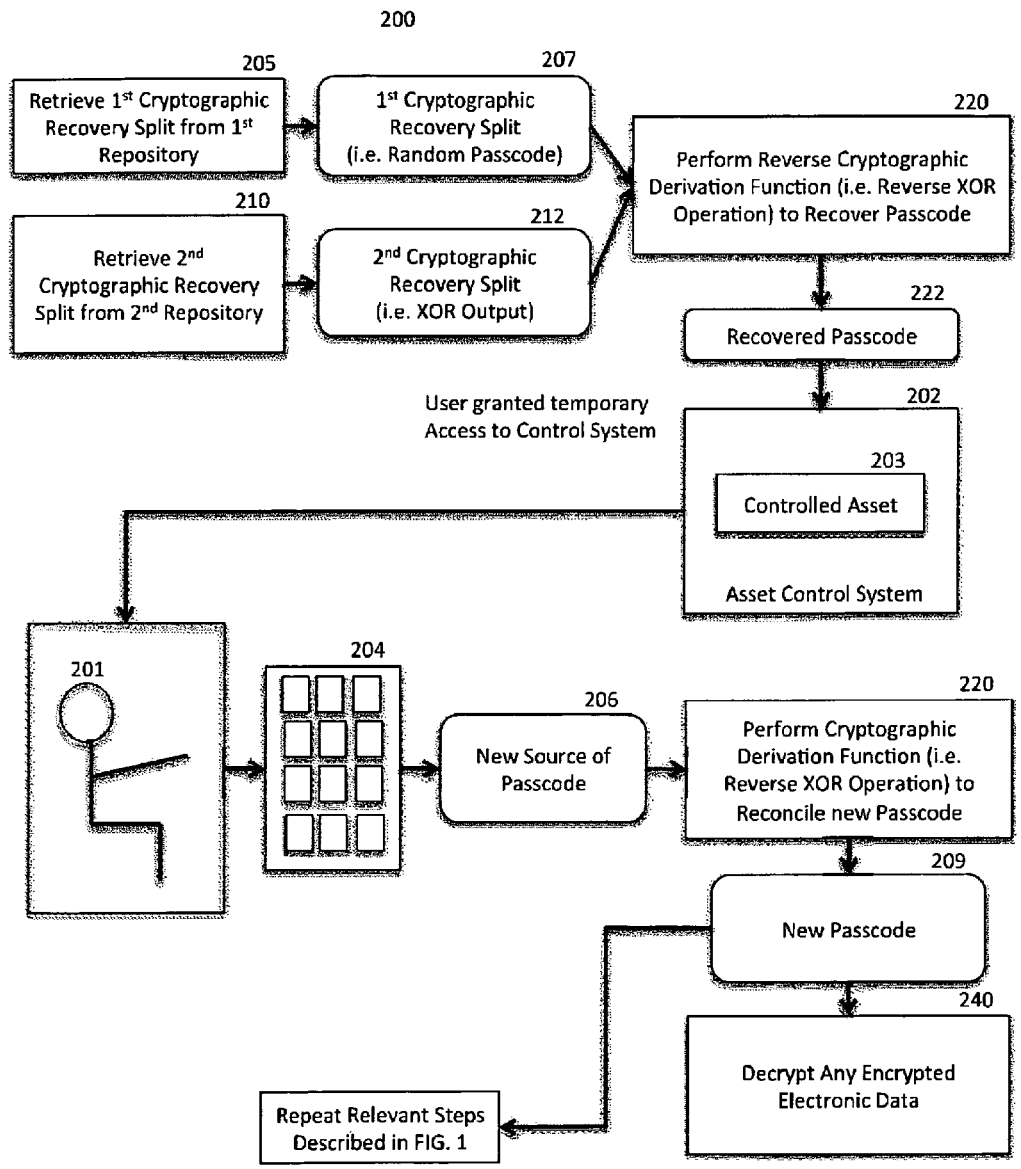
FIG. 2 is a diagram of an exemplary embodiment for a passcode recovery process needed when the source of the passcode fails to function in accordance with the teachings of the present invention.

FIG. 2 is a diagram of an exemplary embodiment for a method 200 to recover the passcode 222 when the source of the passcode 201 fails to function. First, the first cryptographic recovery split 207 is retrieved from the first repository 205 and the second cryptographic recovery split 212 is retrieved from the second repository 210. In other words, the random passcode 207 is retrieved from the first repository 205 and the output from the XOR operation 212 is retrieved from the second repository 210. The user 201 can have access to the first repository 205 and can readily obtain the first cryptographic recovery split 207. The first repository 205 is available from the access control system 202, is in the user's possession, or is otherwise directly available to the user through a third party.

Figure 5:
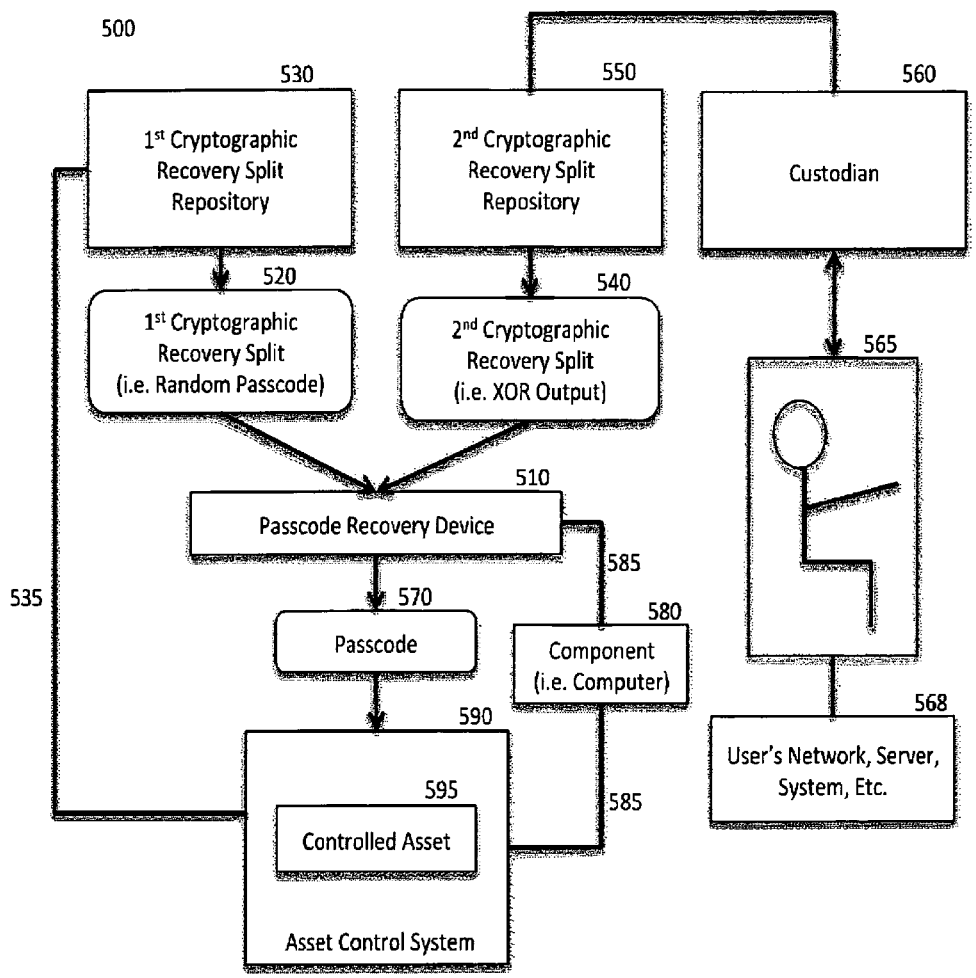
FIG. 5 is a diagram of an exemplary embodiment for a system including a passcode recovery device needed when the source of the passcode fails to function in accordance with the teachings of the present invention.

The output from the XOR operation 212 (or 540 referring to FIG. 5), however, is not directly available to the user 201 (or 515 referring to FIG. 5). Instead, the user 515 must request the output from the XOR operation 540 from a separately controlled second repository 550, referring to FIG. 5. For example, the second repository 550 may be a central database under the control of a custodian 560. To gain access to the output from the XOR operation 540 the user 565 must first authenticate his/her identity, such as by answering questions that only the user 565 would be able to answer or other alternative means of identification commensurate with the security policy of the asset control system 590. This may be accomplished by human interaction, or with an automated system coupled to the central database. Once the user 565 correctly authenticates his/her identity to the custodian 560, the output from XOR operation 540 is released to the user 565, or the access control system 590.

Next referring to FIG. 2, the two cryptographic recovery splits 207 and 212 are recombined by performing a reverse cryptographic derivation function 220 to recover the passcode 222. The XOR operation 220 may be done by a component of the access control system 202, such as a passcode recovery device 570, referring to FIG. 5, or a computer 580 coupled 585 to the access control system 590. The reverse XOR operation 220 uses the random code 207 and the output of the XOR operation 212 as inputs to recover the passcode 222.

With the recovered passcode 222, the user 201 is able to gain temporary access to the access control system 202. Next, a new source of the passcode 206 is supplied such as a new password, new token, or new biometric sample and cryptographically reconciled with the cryptographic derivation function 220 to produce a new passcode 209. The new passcode 209 may be identical to the original passcode 222. Now any encrypted electronic data requiring the recovered passcode 222 may be decrypted 240 to prevent the loss of stored encrypted data. Alternatively the new passcode 209 can be generated with a unique value.

The method described in FIG. 1 can now be repeated 250. Referring to FIG. 1, for example if needed, the new passcode 105 may be converted into a numeric value 151. Next, a new random code 161 is created that is at least the same order of magnitude as the original passcode or new passcode 105. Finally the new passcode 105 and new random code 161 are used as inputs in the cryptographic derivation function 170 to form a second cryptographic recovery split 171 with the first cryptographic recovery split 161 stored in one repository 180 and the second cryptographic recovery split 171 stored in a second repository 190.

Figure 3:
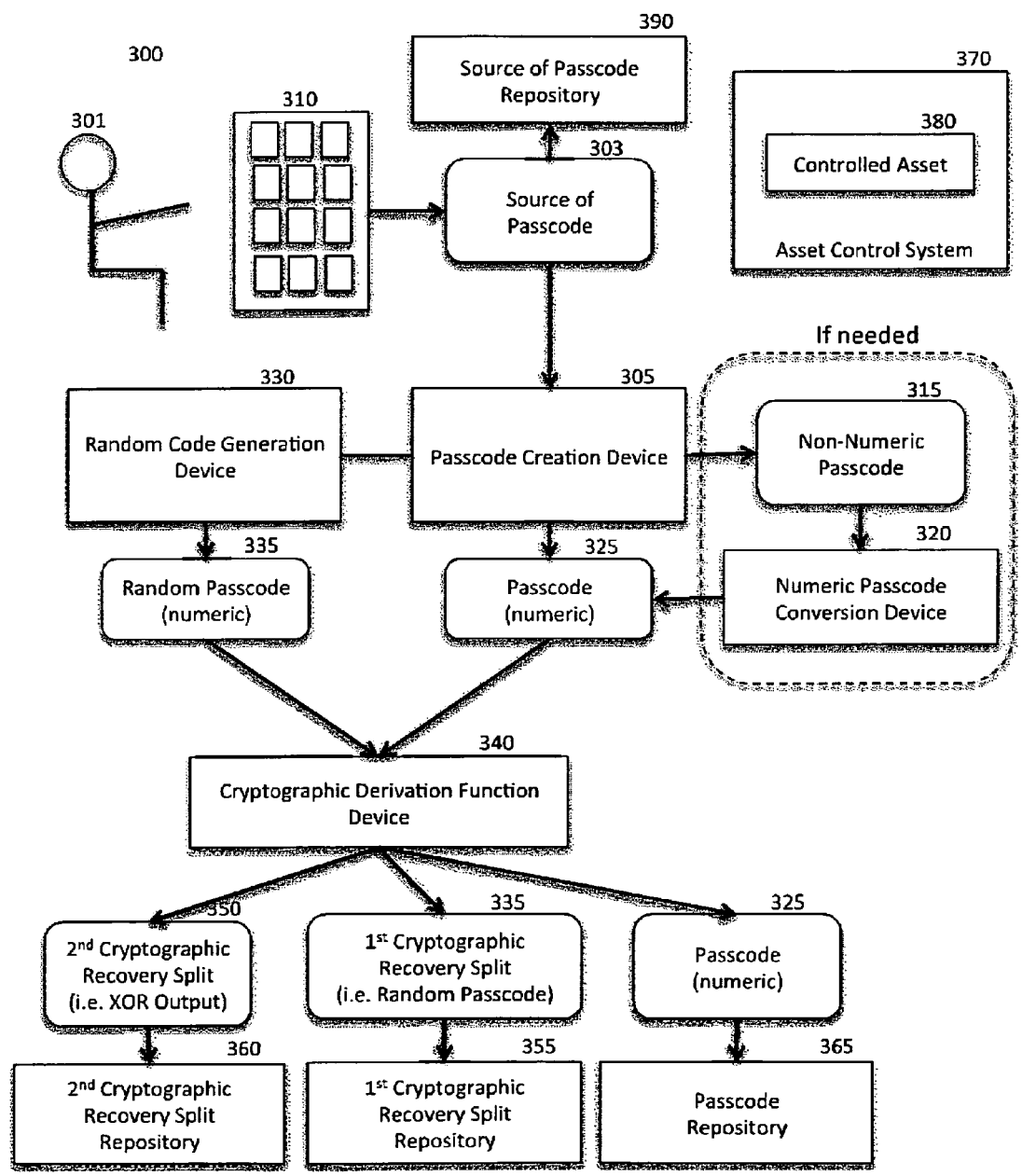
FIG. 3 is a diagram of an exemplary embodiment for a system to create a passcode and the cryptographic recovery splits needed for the passcode recovery process in accordance with the teachings of the present invention.

FIG. 3 is an embodiment of the invention for a system 300 used to create a passcode 325 which may be derived from a source of the passcode 303 such as a password, token, or biometric sample to allow a user 301 access to controlled assets 380 in an access control system 370. The system 300 comprises a passcode creation device 305. In one embodiment, the passcode creation device 305 comprises a numerical input console 310 such as a keyboard, or other type of numeric console for inputting the source of the passcode 303. The source of the passcode 303 may include a password, token, or biometric sample. In some circumstances, the passcode creation device 305 may comprise an input console 310 that creates a non-numeric passcode 315 such as a code using letters or special characters. In such a circumstance, the non-numeric passcode 315 must be converted to a numerical passcode 325 using a numeric code conversion device 320. Next, the passcode creation device 305 is coupled to a random code generation device 330 that uses a predetermined value or creates a random code 335 of at least the same order of magnitude as the passcode 325 to be used as a first cryptographic recovery split. For example, if the passcode 325 comprises a number with six digits, the random code generation device 330 will create a random code 335 also comprising at least six digits. It is important for the random code 335 to have the same order of magnitude or greater than the passcode 325 so the two binary components can be used as inputs to a cryptographic derivation function device 340.

Next the system comprises a cryptographic derivation function device 340 that executes a cryptographic split operation using the passcode 325 and random code 335 as inputs to form a second cryptographic recovery split 350. The cryptographic derivation function device 340 accomplishes the cryptographic split by using a reversible algorithm such as the Exclusive-OR ("XOR") binary Boolean algebraic operation. The random code 335 and the passcode 325 are used as inputs for a cryptographic derivation function to form a second cryptographic recovery split 350. More cryptographic recovery splits may be generated if needed, but two is the minimum required. The first cryptographic recovery split, i.e. the random code 335, is stored in one repository 355 and the second cryptographic recovery split, i.e. the output to the XOR operation 350, is stored in a second repository 360. The order in which the cryptographic recovery splits are stored is not significant. In other words, the output from the XOR operation 350 could be stored in the first repository 355 and the random code 335 could be stored in the second repository 360. The repositories 355 and 360 may include any type of permanent or semi-permanent storage device capable of retaining the cryptographic recovery split such as random access memory (RAM) and read only memory (ROM) in a computer, server, network, and electronic database; printed on paper; or output onto a punch card.

The source of the passcode 303 is not stored in the first or second repositories 355 and 360; instead it is either stored in the user's memory, on an access card or another type of storage device 303 separate from the first or second repositories 355 and 360. The passcode 325 is also not stored on the first or second repositories 355 and 360; instead it is stored in a passcode repository 365 separate from the first or second repositories 355 and 360.

Figure 4:
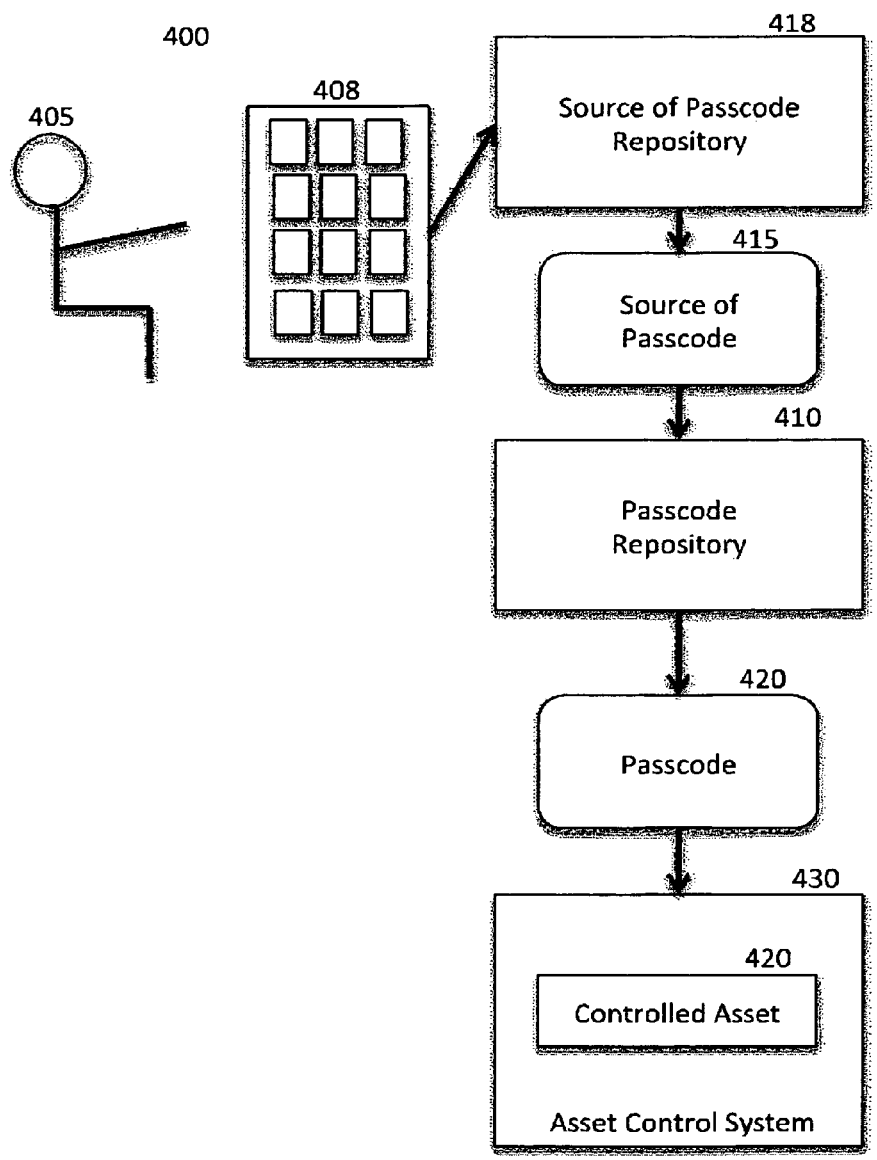
FIG. 4 is a diagram of an exemplary embodiment for a system that uses the source of the passcode to gain access to the controlled assets being protected by the access control system in accordance with the teachings of the present invention.

FIG. 4 is a diagram of the invention 400 illustrating a typical use in which the user 405 retrieves the source of the passcode 415 from the source of the passcode repository 418 which in turn enables the passcode 420 to be retrieved from the passcode repository 410 and passed to the access control system 430 to gain access to the controlled assets 420 within the access control system 430. To access the source of the passcode, the user may use some source 408 such as a password entered with a console, via a token, or from a biometric sample. The access control system 430 authenticates the passcode 420 and then allows the user 405 access to the controlled assets 420.

FIG. 5 is a diagram of an exemplary embodiment of the invention for a system 500 used to recover a passcode 570 when the source of the passcode 303 (referring to FIG. 3) such as a password, token, or biometric sample fails to function comprising a first passcode recovery device 510. The passcode recovery device 510 retrieves the random code 520 from the first repository 530 and the output from the XOR operation 540 from the second repository 550. The first repository 530 is situated such that the user 565 has ready access to the first repository 530 to obtain the random code 520. For example, the first repository 530 may be coupled 535 to the access control system 590, the user's computer, local system, server, or network 568 in the user's possession, or otherwise directly available to the user 565.

The output from the XOR operation 540, however, is not directly available to the user 565. The user 565 must request the output from the XOR operation 540 from a separately controlled second repository 550. For example, the second repository 550 may be a central database, server, computer, or network under the control of a custodian 560. To gain access to the output from the XOR operation 540, the user 565 must first authenticate his/her identity by answering questions that only the user 565 would be able to answer. This may be accomplished by human interaction, or with an automated system coupled to the separately controlled second repository 550. Once the user 565 correctly authenticates his/her identity to the custodian 560, the output from XOR operation 540 is released to the passcode recovery device 510.

The passcode recovery device 510 then executes an inverse cryptographic split operation using the random code 520 and the output of the XOR operation 540 as inputs to reproduce the original passcode 570. The passcode recovery device 510 may be a component of the access control system 590, such as a computer 580 coupled 585 to the access control system 590.

The user 565 is thus able to gain temporary access to the access control system 590 once the passcode 570 has been recovered. The process and devices used to create the passcode and recovery features can again be repeated. Referring to FIG. 1, the user 301 then supplies a new source for the passcode 303 such as a new password, new token, or new biometric sample that is cryptographically reconciled with the cryptographic derivation device 340. Any electrical data encrypted with the passcode may be decrypted preventing loss of stored encrypted data. Finally, the devices comprising this system described in FIG. 1 through FIG. 5 may be used again to create new cryptographic recovery splits.

Figure 6:
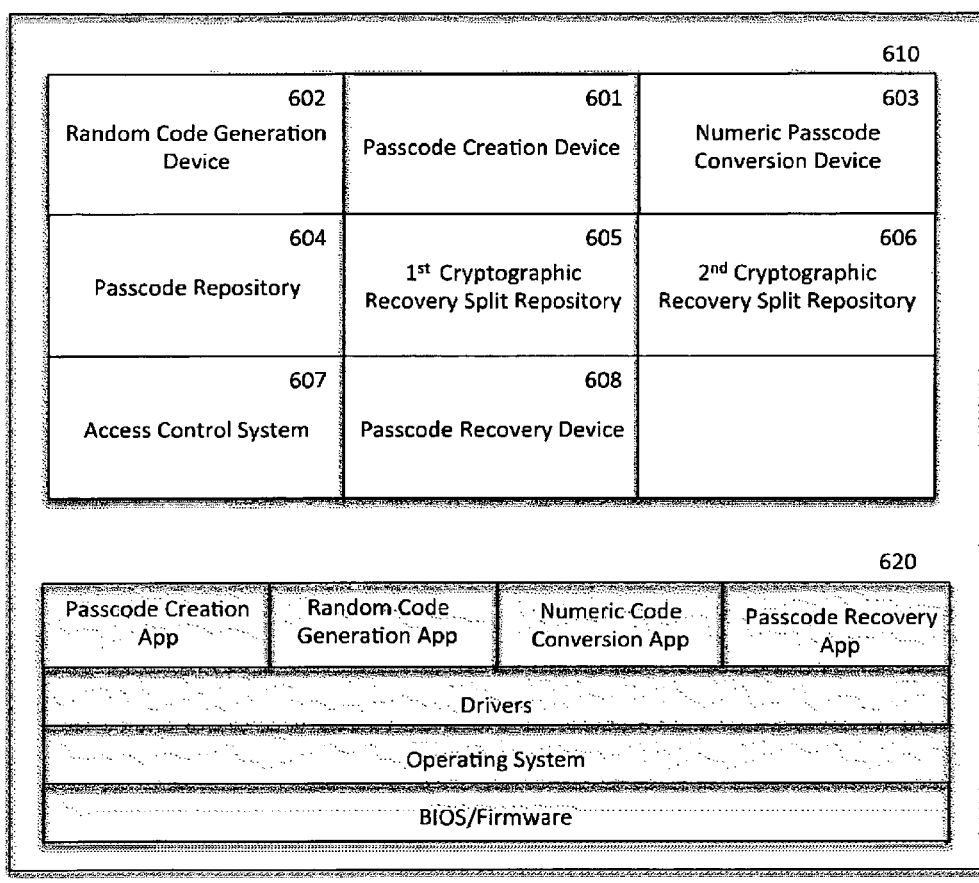
FIG. 6 is a diagram of an exemplary embodiment for an apparatus incorporating components that function in accordance with the teachings of the present invention.

Throughout this description reference was made to several discreet devices, such as the passcode creation device 601, random code generation device 602, numeric passcode conversion device 603, passcode repository 604, first and second cryptographic recovery split repositories 605 and 606, access control system 607, and a passcode recovery device 607. An apparatus such as a computer, electronic, or security apparatus may be devised where such discreet devices are combined into fewer devices, or designed with components and programed to execute the steps and incorporate the features described in this invention. FIG. 6 illustrates an example, where the hardware 610 and software 620 of a computer, electronic system, or security system 600 could be designed to perform many, and possibly all of the functions and features described by this invention.

Several devices described throughout this invention may be coupled in a manner that allows the exchange and interaction of data, such that the operations and processes described may be carried out. For example, the devices may be coupled with electrical circuitry, or through wireless networks that allow the devices to transfer data, receive power, execute the operations described, and provide structural integrity.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method for creating a passcode within an access control system allowing a user access to controlled assets comprising:
    obtaining a source and creating a passcode from the source, wherein the source is provided by a non-numeric input device yielding a non-numeric passcode that is converted to a numeric passcode;
    generating a random code that is at least the same order of magnitude as the passcode for use as a first cryptographic recovery split;
    using the passcode and the random code as inputs in a cryptographic derivation function to form a second cryptographic recovery split;
    storing the first cryptographic recovery split in a first repository within the access controlled system and storing the second cryptographic recovery split in a second repository outside of the access control system.

2. The method of claim 1, wherein the passcode is created from a token that stores the source for the passcode on a token device such as an RF chip within a fob or an access card.

3. The method of claim 1, wherein the passcode is created from a source provided by a biometric system that associates the source of the passcode to biometric features of a person.

4. The method of claim 1, wherein the cryptographic derivation function is a reversible algorithm such as the Exclusive-OR ("XOR") binary Boolean algebraic operation.

5. The method of claim 1, wherein the second cryptographic recovery split is stored in a second repository that is under the control of a custodian that is a separate entity than the user.

6. A method for creating a passcode within an access control system allowing a user access to controlled assets comprising:
    obtaining a source and creating a passcode from the source;
    generating a random code that is at least the same order of magnitude as the passcode for use as a first cryptographic recovery split;
    using the passcode and the random code as inputs in a cryptographic derivation function to form a second cryptographic recovery split; and storing the first cryptographic recovery split in a first repository within the access controlled system and storing the second cryptographic recovery split in a second repository outside of the access control system, wherein the second repository is under the control of a custodian that is a separate entity than the user.

7. The method of claim 6, wherein the passcode is created from a source provided by a numerical input device yielding a numeric passcode.

8. The method of claim 6, wherein the passcode is created from a source provided by a non-numeric input device yielding a non-numeric passcode.

9. The method of claim 8, wherein the non-numeric passcode is converted to a numeric passcode.

10. The method of claim 6, wherein the passcode is created from a token that stores the source on a token device such as an RF chip within a fob or an access card.

11. The method of claim 6, wherein the passcode is created from a source provided by a biometric system that associates the source to biometric features of a person.

12. The method of claim 6, wherein the cryptographic derivation function is a reversible algorithm such as the Exclusive-OR ("XOR") binary Boolean algebraic operation.

13. A method for creating a passcode within an access control system allowing a user access to controlled assets comprising:

obtaining a source and creatin a passcode from the source wherein the source is provided by a non-numeric input device yielding a non-numeric passcode that is converted to a numeric passcode;

generating a random code that is at least the same order of magnitude as the passcode for use as a first cryptographic recovery split;

using the passcode and the random code as inputs in a cryptographic derivation function to form a second cryptographic recovery split; and storing the first cryptographic recovery split in a first repository within the access controlled system and storing the second cryptographic recovery split in a second repository outside of the access control system, wherein the second repository is under the control of a custodian that is a separate entity than the user.

14. The method of claim 13, wherein the passcode is created from a token that stores the source on a token device such as an RF chip within a fob or an access card.

15. The method of claim 13, wherein the passcode is created from a source provided by a biometric system that associates the source to biometric features of a person.

16. The method of claim 13, wherein the cryptographic derivation function is a reversible algorithm such as the Exclusive-OR ("XOR") binary Boolean algebraic operation.

\* \* \* \* \*